United States Patent [19]

Hamada et al.

[11] Patent Number: 4,720,719
[45] Date of Patent: Jan. 19, 1988

[54] FILM WIND-UP APPARATUS

[75] Inventors: Hisashi Hamada, Tokyo; Katsuhiko Yamamoto, Saitama; Takeshi Yoshino, Saitama; Masayoshi Hirai, Saitama; Shiro Hashimoto, Saitama; Michihiro Shiina, Saitama; Shigenori Goto, Saitama, all of Japan

[73] Assignee: Fuji Photo Film Co., Ltd., Kanagawa, Japan

[21] Appl. No.: 20,013

[22] Filed: Feb. 26, 1987

[30] Foreign Application Priority Data

Feb. 26, 1986 [JP] Japan .................................. 61-40591

[51] Int. Cl.⁴ ......................... G03B 1/12; G03B 17/30
[52] U.S. Cl. .................................. 354/173.1; 354/174
[58] Field of Search ............... 354/173.1, 173.11, 174, 354/275

[56] References Cited

U.S. PATENT DOCUMENTS 3,747,497  7/1973  Daitolsu et al. ............... 354/174 X Primary Examiner—Michael L. Gellner
Attorney, Agent, or Firm—Young & Thompson

[57] ABSTRACT

A film wind-up apparatus is incorporated in an interchangeable film magazine adapted to receive a film which has a backing paper including a leading end portion. The winding device automatically winds up the leading end portion only after the magazine is attached to a camera having a winding motor, film is loaded in the film magazine, the back cover of the magazine is closed, and a light-shielding plate is removed. Upon completion of the winding operation, a photosensitive portion of the film faces the exposure aperture, and a camera so equipped is ready to make exposures.

5 Claims, 2 Drawing Figures

FILM WIND-UP APPARATUS

The present invention relates to a film wind-up apparatus incorporated in a film magazine that can be detachably mounted on a camera.

BACKGROUND OF THE INVENTION

Large format, still picture cameras that use films having a backing paper, are widely used. Some of these cameras are used in connection with film magazines that can be detachably mounted thereon. Such cameras are advantageous in applications where it is necessary to interchange different types of films, such as film for use in daylight, tungsten films, color films, monochromatic films and the like. For using different types of films interchangeably, a plurality of film magazines containing the different types of films is required, which magazines are selectively mounted on the camera depending on the type of photographs it is desired to take. Interchangeable film magazines of this type that have been recently developed and are now on the market incorporate motor-driven film wind-up mechanisms for easier and improved operation. The motor-driven film wind-up mechanism is electrically coupled to a controller in the camera body by mounting the film magazine on the camera body whereafter it can be operated by electric signals issuing from the controller in the camera body.

The above-described interchangeable film magazine is generally provided with a light-shielding plate made of opaque material, in order to prevent a film loaded therein from being exposed to ambient light when the magazine is detached from the camera. The light-shielding plate is adapted to be inserted into the film magazine to cover an exposure aperture formed in a front wall of the film magazine in a light-tight fashion, and to be removed before making exposures.

After the film is loaded in the film magazine, the magazine is mounted on the camera, and the light-shielding plate is removed from the magazine, the camera is not yet ready for making exposures; this is because an excess leading end portion of the film's backing paper covers the exposure aperture. For this reason, it is necessary to wind up the leading end of the backing paper to advance a photosensitive section of the film in alignment with the exposure aperture, before making exposures. Winding of the backing paper leading end has previously been effected by first aligning a mark on the back surface of the backing paper leading end with an index mark at a particular position on the inside of the film magazine. The back cover of the film magazine is then closed, and the loaded film is advanced a predetermined length prior to making the first exposure. This preliminary film wind-up operation may be performed manually by manipulating a film wind-up handle or by manipulating a button that causes a motor to rotate, if the film magazine is equipped with a motor-driven film wind-up mechanism.

An attendant disadvantage of such film magazines is the index-mark alignment operation. When the index-mark alignment is inexact, the photosensitive section of the film will not be accurately advanced, that is, it will be advanced too much or too little relative to the magazine exposure aperture. Precise index-mark alignment is therefore essential every time a new film is loaded in any film magazine, and this is a time-consuming and troublesome operation. Furthermore, when using the interchangeable film magazines, it is necessary to confirm whether the film magazine to be used has been properly loaded and is ready for making exposures, without removing the light-shielding plate therefrom. Such confirmation is also troublesome, and sometimes it is not done at all, especially where a plurality of film magazines are interchanged frequently.

OBJECTS OF THE INVENTION

It is, therefore, an object of the present invention to provide a film wind-up apparatus incorporated in a film magazine, in which no index-mark alignment is necessary.

It is another object of the present invention to provide a film wind-up apparatus incorporated in a film magazine, which can automatically wind a film leader loaded in the film magazine.

SUMMARY OF THE INVENTION

In accordance with the present invention, the film wind-up apparatus comprises means for detecting if the following three conditions have occurred: a film is loaded in a film magazine; the back cover of the film magazine is closed; and the light-shielding plate has been removed from the film magazine. The invention further comprises means for causing a motor-driven film wind-up mechanism to advance a film leader when the said detecting means detects all three of the above conditions.

According to a feature of the present invention, winding up of the film leader is started automatically by the operation of removing the light-shielding plate from the film magazine, which operation is necessary to render a camera with attached film magazine ready for exposures, and which operation is effected after a preliminary loading procedure and before making exposures. This automatic film leader wind-up operation is exceptionally reliable, and is otherwise unrelated to the functioning of a camera and magazine so equipped.

BRIEF DESCRIPTION OF THE DRAWINGS

These and other objects and features of the present invention will become apparent from the following description of a preferred embodiment taken in conjunction with the accompanying drawings, in which.

DETAILED DESCRIPTION OF THE INVENTION

The film wind-up apparatus according to a preferred embodiment of the present invention is incorporated in an interchangeable film magazine detachably mountable on large format, still picture cameras. Because such film magazines are well known in the art, this description will be directed in particular to elements forming part of, or cooperating directly with apparatus embodying the present invention. It is to be understood that film magazine elements not specifically shown or described may take any of various forms well-known to those skilled in the art.

Figure 1:
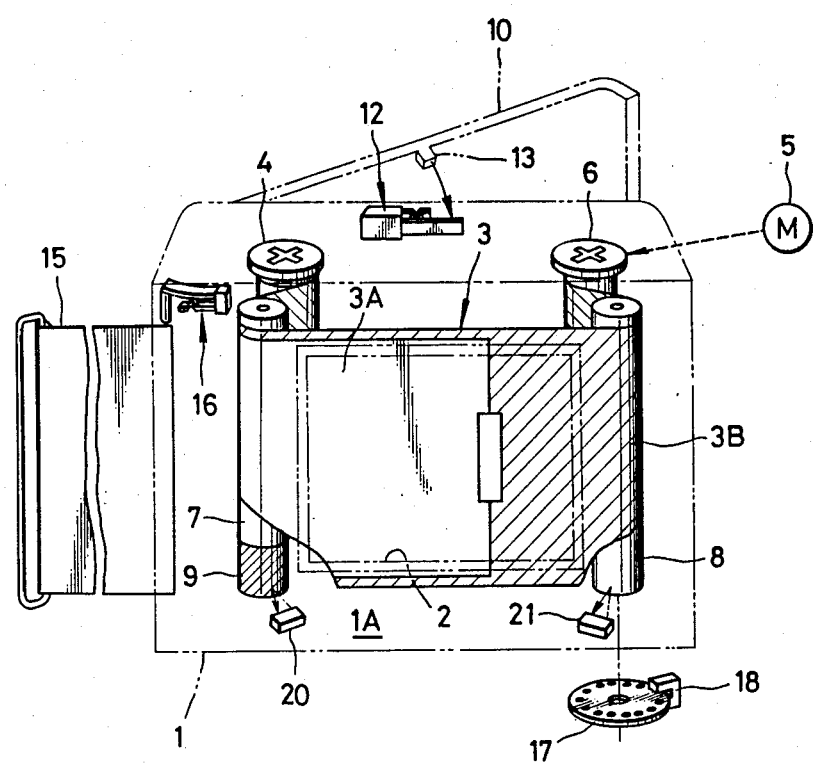
FIG. 1 is a schematic perspective view of a film magazine embodying the present invention.

Referring now to FIG. 1, shown therein is a boxlike film magazine 1 embodying the present invention. In the film magazine 1 there is a film wind-up mechanism which includes detachably mounted film supply and film take-up reels 4 and 6 disposed on either side of an exposure aperture 2 formed in the front wall 1A of the film magazine 1. The film supply reel 4 has an unexposed film 3 previously rolled therearound, and the film take-up reel 6 is adapted to be rotated by an electric motor 5 with its associated gear train (not shown) so as to wind up the exposed part of the film 3. Between the film supply and film takeup reels 4 and 6 are a pair of guide rollers 7 and 8 supported in the film magazine 1 which are caused to rotate by the film 3 as it is advanced. Each guide roller 7, 8 generally has a high-reflective outer surface, but the guide roller 7 has a low-reflective outer surface 9 at its lower end portion.

On the back side of the film magazine 1 is a back cover 10 adapted to open and close for loading and unloading the film 3. Intermediate the inside upper edge of the back cover 10 there is provided a projection 13 which can turn ON and OFF a mechanical switch 12 disposed inside the film magazine 1. Specifically, the projection 13 allows the switch 12 to turn ON when the back cover 10 is opened and displaces the same to turn OFF when the back cover 10 is closed. As shown at 15 in FIG. 1 there is a light-shielding plate removably insertable into the film magazine 1 for covering the exposure aperture 2 in a light-impervious fashion. Inside the film magazine 1 at an entrance slot for the light-shielding plate 15 there is a mechanical switch 16 adapted to close or turn ON only by removing the light-shielding plate 15 from the film magazine 1. The light shielding plate 15 thus keeps the switch 16 turned OFF when inserted in the film magazine 1.

Reflection-type photosensors 20 and 21 are disposed facing the lower end portions of the guide rollers 7 and 8, respectively. Each photosensor outputs a low-level signal hereinafter referred to as an L signal) when it detects a high-reflective surface, and high-level signal (hereinafter referred to as an H signal) when it detects a low-reflective surface. It should be noted that the film 3, which is of a large format, comprises a photosensitive film 3A having a high reflectance and a backing paper 3B that has a low reflectance and is opaque. Photosensor 20 therefore outputs an L signal only when it detects the photosensitive film 3A, but outputs an H signal not only when it detects the backing paper 3B but also when no film is loaded. On the other hand, photosensor 21 outputs an H signal only when it detects the backing paper 3B, and an L signal in any other case.

At the bottom of the guide roller 8 there is a pulse generating means comprising a disk 17 attached thereto and formed with a plurality of small holes at regular angular intervals, and a transmission-type photosensor 18 adapted to provide a pulse signal every time it detects a hole. Consequently, the photosensor 18 can provide pulse signals the number of which is in proportion to the number of rotations of the guide roller 8 and hence an advanced length of the film 3.

Figure 2:
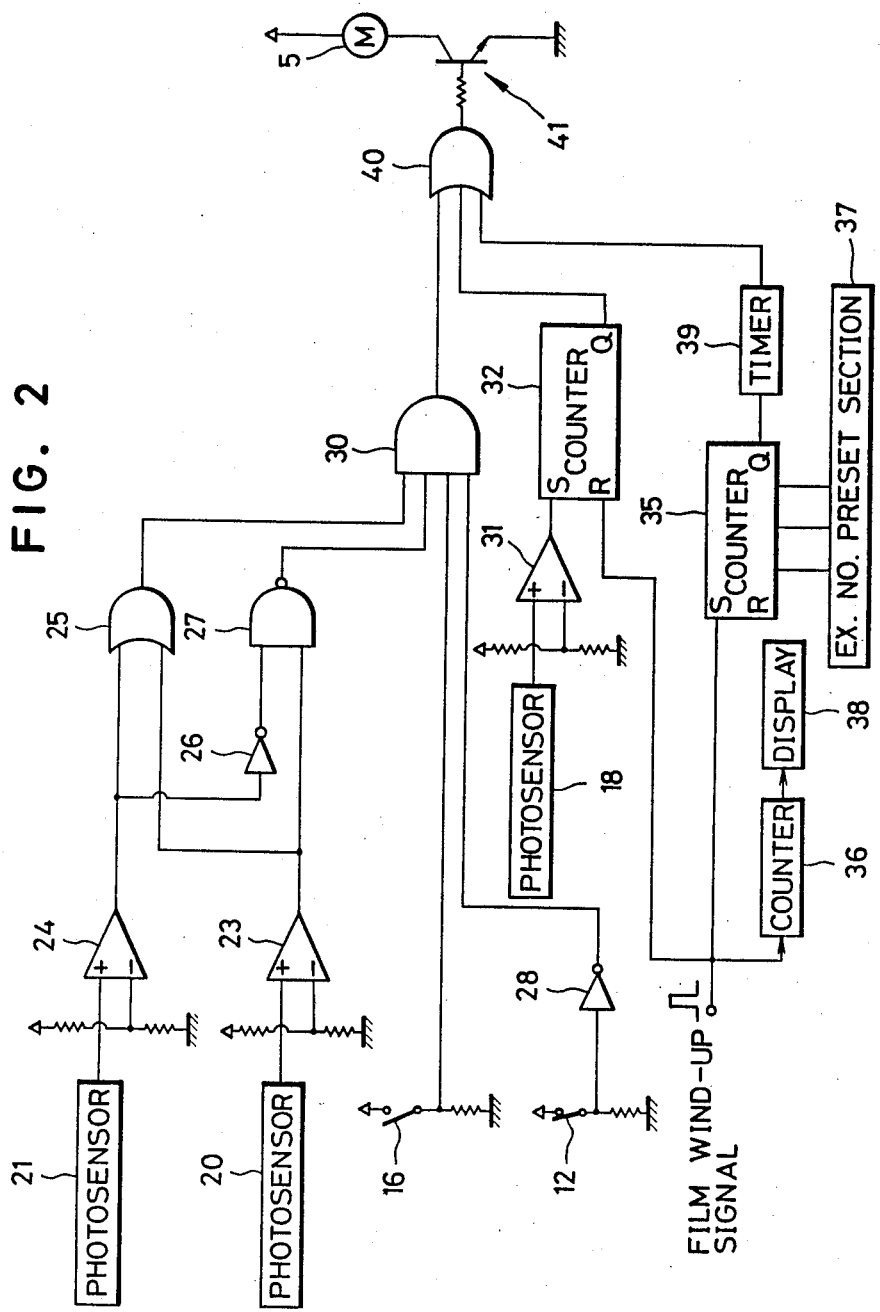
FIG. 2 is a circuit diagram showing the film wind-up apparatus of the present invention.

Referring now to FIG. 2, shown therein is a control circuit incorporated in the above-described film magazine 1. In the control circuit there are comparators 23 and 24 to which signals are supplied from the photosensors 20 and 21, respectively. Each comparator 23, 24 provides an output which in turn is supplied in parallel to OR gate 25 and NAND gate 27. The lower branch of the output from the comparator 24 is inverted through an inverter 26 before being supplied to NAND gate 27. Outputs from the OR gate 25 and the NAND gate 27 are supplied to AND gate 30, which is also supplied with a signal from the switch 12 through an inverter 28, and a signal from the switch 16.

The photosensor 18 outputs a train of pulses which is transmitted through a comparator 31 to a counter 32 to be counted up. This counter 32 is adapted to output an H signal at terminal Q upon the occurrence of a reset signal at its reset terminal R, and to output an L signal once a predetermined number of pulses has been counted. For this reset signal it is desirable to use a film wind-up signal that is produced upon completion of an exposure, to cause the film wind-up mechanism to wind up the film 3 one frame. Specifically, the film wind-up signal is produced as a pulse signal in response to either the end of shutter operation or an instruction from the camera CPU to execute a sequential exposure mode of the camera. This film wind-up signal is simultaneously supplied to counters 35 and 36.

The counter 35 counts up to a predetermined number of film wind-up signals, which number is preset therein by an exposure number setting section 37, and thereafter outputs an H signal at its Q terminal. Upon commencement of the H signal at the Q terminal a timer 39 begins operating and outputs an H signal for predetermined duration of time which is equal to the time required to completely wind the trailing end of the backing paper 3B around the film take-up spool 6, after the last frame of the film 3 has been exposed. The counter 36 counts up the film wind-up signals, and visually indicates the counted number on a display 38, for example a liquid crystal display panel or an LED display panel. The outputs from AND gate 30, counter 32, and timer 39 are all supplied to OR gate 40. Consequently, as soon as any one of the outputs to the OR gate 40 becomes high level, the OR gate 40 renders a swinging transistor 41 conductive, thereby causing the electric motor 5 to rotate.

The operation of the film wind-up apparatus of the present invention will now be described in detail. When no film is loaded in the film magazine 1, the comparator 23 outputs an H signal, and the comparator 24 outputs an L signal; the NAND gate 27 therefore outputs an L signal, which means no film is loaded in the film magazine 1. Because there is an L signal at the output terminal of the NAND gate 27, the AND gate 30 will not output an H signal, regardless of whether the switches 12 and 16 are closed or opened, namely whether the back cover 10 and the light-shielding plate 15 are opened or closed. At this time no film advance signal is issued, even if a shutter operation is made, as a result of an instruction from the above-mentioned CPU (not shown) which executes a sequential exposure mode, supply no H signal to any one of the input terminals of the OR gate 40. Consequently, the switching transistor 41 is maintained non-conductive so as not to rotate the electric motor 5.

After opening the back cover 10 and then loading a film 3 in the film magazine 1, that part of the backing paper 3B which forms a leader for the film 3 is laid over the exposure aperture 2, it being detected thereby the photosensors 20 and 21. The photosensors 20 and 21 therefore both provide H signals, which signals in turn cause the OR gate 25 and the NAND gate 27 to output H signals. In this condition, closing of the back cover 10 causes the switch 12 to turn OFF, and switch 12 thus outputs an L signal which is inverted through the inverter 28 and supplied as an H signal to the AND gate 30. On the other hand, removal of the light-shielding plate 15 causes the switch 16 to turn ON, and switch 16 thus outputs an H signal which is also supplied to the AND gate 30. Consequently, the AND gate 30 outputs an H signal at its output terminal, and the OR gate 40 therefore must also output an H signal. As a result of the presence of the H signal at the output terminal of the OR gate 40, the switching transistor 41 is rendered conductive, causing the electric motor 5 to start its rotation.

When the electric motor 5 rotates as described above, the film 3 is advanced. As the film 3 advances, the photosensitive portion 3A proceeds into alignment with the exposure aperture 2. When the leading end of the photosensitive film 3A reaches the position shown in FIG. 1, the photosensor 20 detects the photosensitive film 3A, causing comparator 23 to output an L signal. Nevertheless, the output from each of the OR gate 25 and the NAND gate 27 continues to be an H signal, and the electric motor 5 thus continues to rotate.

As soon as the leading end of the photsensitive film 3A reaches the guide roller 8 and is detected by the photosensor 21, both the photosensors 20 and 21 output L signals, which in turn cause the AND gate 30 to output an L signal, thereby rendering the switching transistor 41 non-conductive. Consequently, at the moment the photosensor 21 detects the photosensitive film 3A the motor 5 stops quickly.

As is apparent from the above description, only after having loaded a film, closed the back cover 10, and then removed the light-shielding plate 15, the loaded film 3 is advanced and stopped so as to position the first frame thereof in alignment with the exposure aperture 2. This film advancement automatically ensures the winding-up of the leading end of the backing paper 3B.

Ater the leading end of the backing paper 3B has been wound, the electric motor 5 will rotate to advance the film each time the counter 32 is reset by the film wind-up signal; the motor 5 will cease rotation each time the counter 32 has counted a predetermined number of pulses output by the photosensor 18, corresponding to a one-frame film advance. When the counter 35 has counted a number of film wind-up signals equal to the preset number of exposures, it outputs an H signal at its Q terminal, thereby causing the timer 39 to render the switching transistor 41 conductive for the predetermined interval, and non-conductive thereafter, stopping the electric motor 5. In this operation, the trailing end of the backing paper 3B is completely wound around the film take-up reel 6.

If, before the preset number of exposures has been taken, the back cover 10 is accidentally opened and then closed, or the light-shielding plate 15 is inserted and then removed, no film advancement will occur, because of the presence of an L signal at the output terminal of the AND gate 30. When using a different type of film magazine provided with a detachable inner frame having the guide rollers 7 and 8 mounted therein, it is not always necessary to detach the film magazine from the camera body for loading a film. For this reason, it is possible to load a film with the light-shielding plate removed. In this case, the leading part of the backing paper can be wound up as soon as the back cover is closed, after the new film has been loaded. It is desirable in this case to provide a locking mechanism that prevents operation not only of the film magazine but also of the camera.

It should be noted that, in place of the pair of photosensors 20 and 21 for detecting the backing paper, means can be provided between the guide rollers, such as an extra photosensor, a micro-switch and so on.

Although the invention has been described in detail with reference to the disclosed embodiment, it will be appreciated by those skilled in the art that various modifications of the invention are possible without departing from the spirit and scope of the invention.

What is claimed is:

1. In a film magazine for housing a film having a backing paper including at least a leading end portion extending from said film and a photosensitive portion, said film magazine being adapted to be detachably mounted on a camera, said magazine comprising an opening defining an exposure aperture, a back cover adapted to open and close for allowing loading and unloading of said film therein, a light-shielding plate removably insertable in said magazine for selectively closing said exposure aperture, and means adapted to be driven by an electric motor of a said camera, for winding said film; the improvement comprising:
    control means for enabling and disabling said motor of said camera;
    first detecting means for detecting a first condition wherein said leading end portion of said film and said exposure aperture are in facing relation, a second condition wherein said back cover is closed, and a third condition wherein said light-shielding plate has been removed from said magazine, said control means enabling said motor of said camera responsive to simultaneous detection of said first, second and third conditions by said first detecting means; and
    second detecting means for detecting a fourth condition wherein a photosensitive portion of said film and said exposure aperture are in facing relation, said control means disabling said motor responsive to detection of said fourth condition by said second detecting means;
    whereby the said leading end portion of a said film loaded in said magazine will be automatically wound prior to making exposures.

2. Film magazine according to claim 1, wherein said first detecting means comprises an AND gate having an output terminal connected to said control means.

3. Film magazine according to claim 2, wherein said second detecting means comprises a pair of photosensitive elements disposed on opposite sides of said exposure aperture, and an OR gate having an output terminal connected to an input terminal of said AND gate, said OR gate outputting a first signal only when both of said pair of photosensitive elements detect a said photosensitive portion of said film.

4. Film magazine according to claim 2, wherein said first detecting means comprises a first switch for detecting when a said leading end portion of a said film is in facing relation with said exposure aperture and outputting a signal responsive to such detection, a second switch for detecting when said back cover is closed and outputting a signal responsive thereto, and a third switch for detecting when said light-shielding plate is removed from said magazine and outputting a signal responsive thereto, and means supplying all said signals to said AND gate.

5. Film magazine according to claim 2, wherein said control means comprises a switching circuit having a transistor.

* * * * *